United States Patent [19]

Lustig et al.

[11] 4,293,664

[45] Oct. 6, 1981

[54] COOK-IN FILM CONTAINING A BLEND OF IONOMER AND ELASTOMER

[75] Inventors: Stanley Lustig, Park Forest; Stephen J. Vicik, Darien, both of Ill.

[73] Assignee: Union Carbide Corporation, New York, N.Y.

[21] Appl. No.: 107,568

[22] Filed: Dec. 27, 1979

[51] Int. Cl.³ .................... C08L 23/16; C08L 33/02
[52] U.S. Cl. .................... 525/196; 525/221; 525/211
[58] Field of Search .................... 525/196, 221, 211

[56] References Cited

U.S. PATENT DOCUMENTS

| 3,264,272 | 8/1966 | Rees | 525/221 |
| 3,454,676 | 7/1969 | Busse | 525/221 |
| 3,639,318 | 2/1972 | Tijunelis et al. | 260/23 XA |

FOREIGN PATENT DOCUMENTS

| 53-61667 | 6/1978 | Japan . |
| 1312808 | 4/1973 | United Kingdom . |

*Primary Examiner*—Carman J. Seccuro
*Attorney, Agent, or Firm*—John C. LeFever

[57] ABSTRACT

A stretchable monolayer film adapted for packaging and cooling poultry, consists essentially of a blend of an ionomer and an elastomer.

10 Claims, No Drawings

COOK-IN FILM CONTAINING A BLEND OF IONOMER AND ELASTOMER

The invention relates to a film adapted for packaging and cooking poultry and particularly to a stretchable monolayer film capable of withstanding both cooking conditions and freezing temperatures.

One of the commercial practices used by manufacturers for the preparation of cooked chickens for sale to retail buyers includes cooking the chicken while it is in a sealed plastic bag.

In a typical operation, a plastic bag is stretched open to accommodate the chicken and then is relaxed, a vacuum is formed to remove most of the air from the bag, and then the opening of the bag is sealed.

The bagged chicken is cooked thoroughly by placing it in water at a temperature of about 165° F. for about three hours or with the use of dry heat. Thereafter, the cooked product is frozen and reheated when ready for use or is removed from the bag and repackaged for later sale.

One of the problems encountered with the prior art bags is that the plastic films incorporate a plasticizer in the film and during the cooking process some of the plasticizer is leached out and the bag tends to become brittle at cold temperatures.

The instant invention overcomes this problem by providing a stretchable film which does not include a prior art plasticizer which is susceptible to being leached out during the cooking process.

One of the principal objects of the invention is a stretchable monolayer film adapted for packaging and cooking a chicken, consisting essentially of a blend of an ionomer and an elastomer.

Preferably, the film contains from about 40% to about 60% by weight of the elastomer and even more preferably the ionomer and elastomer are in equal proportions.

The film of the invention can be formed by conventional blown film processes as well as other prior art processes for producing a film. In addition, a bag can be formed from the film of the invention by conventional methods.

It is well-known that a film made solely from an ionomer would not have the capacity to be stretched substantially and elastically return to its original dimensions. In addition, it is known that a film formed solely from an elastomer within the scope of the invention is unacceptable and would tend to be tacky and weak.

Surprisingly, a blend consisting essentially of the ionomer and elastomer results in a monolayer film which is pliable, stretchable, and strong.

Ionomer used in this invention means the ionic copolymers which consist of $\alpha$-olefins having a carbon number 2 to 4 as described in U.S. Pat. No. 3,264,272 and $\alpha,\beta$-ethylenically unsaturated carboxylic acids having a carbon number 3 to 6 and which contains one or more metallic ions connected to side chains of the polymer.

The uncomplexed metal ions suitable for forming the ionic copolymers of the present invention comprise mono, di or tri-valent metal ions in the Group I, II, III, IV-A and VIII of the Periodic Table of Elements. The preferred examples are $Na^+$, $K^+$, $Li^+$, $Cs^+$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Su^{++}$, $Pb^{++}$, $Fe^{++}$, $Co^{++}$, $Ni^{++}$, $Zn^{++}$, $Al^{++}$, $Sc^{+++}$, $Fe^{+++}$, and $Yt^{+++}$.

In the various ions mentioned above, the most suitable ion is $Zn^{++}$ and another suitable ion is $Na^+$.

The ionomer used in this invention generally comprises more than 50 wt. %, preferably 75 to 95 wt. % of $\alpha$-olefins and 5 to 25 wt. % of $\alpha,\beta$-ethylenically unsaturated carboxylic acid. The preferred ionomer for this invention is ethylene-methacrylic acid copolymer having 75 to 95 wt. % of ethylene components.

The term "elastomer" as used herein refers to elastomeric polymeric compositions which are well-known in the art such as described in U.S. Pat. No. 4,082,877 to Shadle.

Preferably, the elastomer suitable for the invention is either a saturated ethylene-propylene copolymer or an unsaturated ethylene-propylene non-conjugated diene terpolymer.

Preferably, the saturated ethylene-propylene copolymer elastomer has a Mooney viscosity of about 45 or more and the unsaturated ethylene-propylene non-conjugated diene terpolymer elastomer has a Mooney viscosity of about 65 or more. The Mooney viscosity is measured at 125° C.

The film of the invention has a thickness of from about 1.0 to about 3.0 mils and preferably a thickness of about 2.0 mils.

Illustrative, non-limiting examples of the practice of the invention are set out below. Numerous other examples can readily be evolved in the light of the guiding principles and teachings contained herein. The examples given herein are intended merely to illustrate the invention and not in any sense to limit the manner in which the invention can be practiced. The parts and percentages recited herein and all through this specification, unless specifically stated otherwise, refer to parts by weight and percentages by weight.

Table 1 shows the ionomers used in the examples.

TABLE 1

| Ionomer | Description |
|---|---|
| Ionomer A | Ethylene-methacrylic acid copolymer with 10% acid neutralized with a sodium salt. |
| Ionomer B | Ethylene-methyacrylic acid copolymer with 12% acid neutralized with a zinc salt. |

The elastomers used in the examples are given in Table 2.

TABLE 2

| Elastomer | Description |
|---|---|
| Elastomer A | Ethylene-Propylene copolymer rubber having a Mooney viscosity of about 23 at 125° C. |
| Elastomer B | Ethylene-propylene copolymer rubber having a Mooney viscosity of about 50 at 125° C. |
| Elastomer C | Ethylene-Propylene (5-ethylidine-2-norbornene) having a Mooney viscosity of about 73 at 125° C. |
| Elastomer D | Ethylene-Propylene (5-ethylidine-2-norbornene) having a Mooney Viscosity of about 60 at 125° C. |

EXAMPLES

Using conventional tubular blown film processes, examples were carried out to endeavor to produce tubular film having a thickness of about 2.0 mils and produced from different blends of the ionomers of Table 1 and the elastomers of Table 2. The results of these examples are shown in Table 3.

The examples were evaluated on the basis of clarity, elasticity, blocking, and heat sealability. The relative merits of these parameters are well known in the art.

Clarity is a measure of the opacity of the film. While a clear film is desirable for many uses, a hazy or even opaque film also has uses. The elasticity of the film is important for the packaging operation described herein. Blocking is the phenomena of the inside surfaces of the extruded tubular extrudate adhering together.

Heat sealability is an important property and a good heat seal is needed for the economical production of bags from film. Thus, this property is important for many commercial operations.

For some examples there were difficulties encountered in extruding using the same conventional tubular extrusion operations used for the other examples. There are numerous extrusion techniques which were not attempted to reduce and eliminate blocking. These and other variations are available to the person utilizing the teachings herein.

TABLE 3

| | Clarity | Heat Sealability | Blocking | Extrudability | Elasticity |
|---|---|---|---|---|---|
| Elastomer A/Ionomer A | | | | | |
| 30%/70% | Clear | Poor | No | Good | Unsat. |
| 50%/50% | — | — | — | Good | Unsat. |
| 70%/30% | Hazy | — | Yes | Good | — |
| Elastomer A/Ionomer B | | | | | |
| 30%/70% | — | Poor | No | Good | Satis. |
| 50%/50% | — | — | Yes | Good | — |
| 70%/30% | Hazy | — | Yes | Good | — |
| Elastomer B/Ionomer A | | | | | |
| 30%/70% | Clear | Poor | No | Good | Satis. |
| 50%/50% | EXCELLENT PROPERTIES | | | | |
| 70%/30% | — | — | — | Poor | — |
| Elastomer B/Ionomer B | | | | | |
| 30%/70% | — | — | — | Good | Unsat. |
| 50%/50% | EXCELLENT PROPERTIES | | | | |
| 70%/30% | — | — | Yes | Good | — |
| Elastomer C/Ionomer A | | | | | |
| 30%/70% | — | — | — | Poor | — |
| 50%/50% | EXCELLENT PROPERTIES | | | | |
| 70%/30% | — | — | — | Poor | — |
| Elastomer C/Ionomer B | | | | | |
| 30%/70% | Hazy | — | Yes | Good | Unsat. |
| 50%/50% | EXCELLENT PROPERTIES | | | | |
| 70%/30% | — | — | — | Poor | — |
| Elastomer D/Ionomer B | | | | | |
| 30%/70% | — | — | — | Good | Unsat. |
| 50%/50% | — | — | Yes | Good | — |
| 70%/30% | — | — | — | Poor | — |

From the examples, it can be seen that an equal blend of Elastomer B with Ionomers A and B produces clear, elastic heat sealable films. Also, an equal blend of Elastomer C with Ionomers A or B produces hazy, elastic heat sealable films. These are particularly surprising results.

We wish it to be understood that we do not desire to be limited to the exact details of construction therein and described, for obvious modifications will occur to a person skilled in the art.

Having thus described the invention, what we claim as new and desire to be secured by Letters Patent, is as follows:

1. A stretchable monolayer film adapted for packaging and cooking pountry, consisting essentially of a blend of (1) ionomer(s) of α-olefin(s) having a carbon number of 2 to 4 and α,β-ethylinically unsaturated carboxylic acid(s) having a carbon number of 3 to 6 containing one or more metallic ions connected to the side chains of the copolymer, and (2) an elastomer selected from the group consisting of a saturated ethylene-propylene copolymer elastomer having a Mooney viscosity greater than about 45 at 125° C. or an unsaturated ethylene-propylene non-conjugated diene terpolymer elastomer having a Mooney viscosity greater than about 65 at 125° C., said film having a thickness of from about 1.0 to about 3.0 mils.

2. The film of claim 1, wherein said elastomer amounts to from about 40% to about 60% by weight of said blend.

3. The film of claim 1, wherein said elastomer and said ionomer are in about equal amounts in said blend.

4. The film of claim 1, wherein said film has a thickness of about 2.0 mils.

5. A bag produced from the film of claim 1.

6. The film of claim 1, wherein said ionomer(s) comprises more than 50 wt. % of α-olefins.

7. The film of claim 1, wherein said ionomer(s) comprises 75 to 95 wt. % of α-olefins and 5 to 25 wt. % of α,β-ethylinically unsaturated carboxylic acid(s).

8. The film of claim 1, wherein said ionomer is an ethylene methacrylic acid copolymer having 75 to 95 wt. % of ethylene components.

9. A stretchable monolayer film adapted for packaging and cooking poultry, consisting essentially of a blend of (1) an ethylene-methacrylic acid copolymer having an acid content of either 10% or 12% by weight neutralized with either a zinc or sodium salt and (a) an ethylene-propylene (5-ethylidene-2-norbornene) unsaturated terpolymer having a Mooney viscosity of about 73 at 125° C., with said copolymer and said terpolymer being in about equal amounts by weight in said blend, and said film having a thickness of about 1.0 to about 3.0 mils.

10. A bag produced from the film of claim 9.

* * * * *

UNITED STATES PATENT AND TRADEMARK OFFICE
CERTIFICATE OF CORRECTION

PATENT NO. : 4,293,664
DATED : October 6, 1981
INVENTOR(S) : Stanley Lustig and Stephen J. Vicik It is certified that error appears in the above—identified patent and that said Letters Patent is hereby corrected as shown below:

Abstract, line 2 for "cooling" read --cooking--.

Column 4, line 23, for "pountry" read --poultry--.

Column 4, line 25, for "ethylinically" read --ethylenically--

Column 4, line 48, for "ethylinically" read --ethylenically--

Signed and Sealed this

Fifth Day of January 1982

[SEAL]

Attest:

GERALD J. MOSSINGHOFF

Attesting Officer

Commissioner of Patents and Trademarks